(12) United States Patent
Jung

(10) Patent No.: US 8,878,400 B2
(45) Date of Patent: Nov. 4, 2014

(54) VOICE COIL MOTOR

(75) Inventor: Taejin Jung, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 295 days.

(21) Appl. No.: 13/441,490

(22) Filed: Apr. 6, 2012

(65) Prior Publication Data

US 2012/0256498 A1 Oct. 11, 2012

(30) Foreign Application Priority Data

Apr. 7, 2011 (KR) .................. 10-2011-0032250

(51) Int. Cl.
*H02K 41/03* (2006.01)
(52) U.S. Cl.
USPC ....................................... 310/12.16; 359/824
(58) Field of Classification Search
USPC ................. 310/12.16, 824–826; 359/824–826
See application file for complete search history.

(56) References Cited

U.S. PATENT DOCUMENTS

| | | | | |
|---|---|---|---|---|
| 5,471,100 A | * | 11/1995 | Sakamoto et al. | 310/12.04 |
| 7,400,068 B2 | * | 7/2008 | Tseng | 310/12.16 |
| 7,719,779 B2 | * | 5/2010 | Yamashita | 359/824 |
| 7,839,585 B2 | * | 11/2010 | Hou et al. | 359/824 |
| 2007/0108847 A1 | * | 5/2007 | Chang | 310/12 |
| 2011/0291495 A1 | * | 12/2011 | Lee et al. | 310/12.16 |

* cited by examiner

*Primary Examiner* — Thanh Lam

(74) *Attorney, Agent, or Firm* — Saliwanchik, Lloyd & Eisenschenk

(57) ABSTRACT

A VCM is disclosed, the VCM including a base formed with an opening; a bobbin arranged on an upper surface of the base and mounted with a lens therein; a plurality of magnets secured on the base to face a periphery of the bobbin; a coil block encompassing each magnet and the bobbin, and secured to a part of the bobbin exposed between the magnets; and a cover can encompassing the magnets and the coil block.

20 Claims, 2 Drawing Sheets

VOICE COIL MOTOR

CROSS-REFERENCE TO RELATED APPLICATION

This application claims the benefit under 35 U.S.C. §119 to Korean Patent Application No. 10-2011-0032250, filed Apr. 7, 2011, which is hereby incorporated by reference in its entirety.

BACKGROUND OF THE DISCLOSURE

1. Field of the Invention

The present disclosure relates to a voice coil motor.

2. Background of the Invention

Recently, a super small digital camera capable of storing a digital image and a moving image is mounted on a smart phone and a tablet PC. A conventional camera mounted with the smart phone and the tablet PC includes a lens and an image sensor module receiving light having passed the lens. The conventional small camera cannot adjust a gap between the lens and the image sensor module to have a difficulty in realizing a high quality digital image or moving image.

Recently, a VCM (Voice Coil Motor) has been developed to adjust a gap between an image sensor module and a lens of the camera. The conventional VCM includes a bobbin mounted with a lens, a coil mounted at a periphery of the bobbin and a magnet opposite to the coil. A magnetic field generated by applying a current to the coil, and a magnetic field generated by the magnet drive the bobbin to adjust a gap between the image sensor module and the lens of the camera.

However, the conventional VCM is disadvantageous in that the coil is arranged at a periphery of the bobbin to have a difficulty in increasing a wound length of coil and to weaken a driving force of the bobbin, such that the wound length of coil is reduced as size of bobbin increases, whereby it is difficult to increase the size of bobbin and subsequently the size of bobbin.

BRIEF SUMMARY

The present disclosure is directed to provide a voice coil motor (VCM) configured to improve driving force of bobbin and to increase size of bobbin, whereby a proper structure for increasing the size of lens mounted on the bobbin can be obtained.

In one general aspect of the present disclosure, there is provided a voice coil motor (VCM), the motor comprising: a base formed with an opening; a bobbin arranged on an upper surface of the base and mounted with a lens therein; a plurality of magnets secured on the base to face a periphery of the bobbin; a coil block encompassing each magnet and the bobbin, and secured to a part of the bobbin exposed between the magnets; and a cover can encompassing the magnets and the coil block.

In some exemplary embodiments of the present disclosure, the bobbin may include a bobbin body and lugs protruded from an external lateral surface of the bobbin body through the magnets.

In some exemplary embodiments of the present disclosure, the bobbin body may take a shape of a cylinder, and each of the lugs may be protruded at an equidistance from the external lateral surface of the bobbin body.

In some exemplary embodiments of the present disclosure, each of the magnets may be arranged at both sides of the lug, and distanced from the coil block.

In some exemplary embodiments of the present disclosure, four lugs may be arranged about the bobbin body.

In some exemplary embodiment of the present disclosure, each lateral surface of each lug facing the coil block may be arranged in parallel with the coil block, and each lateral surface of a pair of adjacently arranged lugs may be arranged at a right angle.

In some exemplary embodiment of the present disclosure, each lug and coil block may be mutually attached by an adhesive.

In some exemplary embodiment of the present disclosure, the coil block may take a shape of a square strip when viewed from a top plan.

In some exemplary embodiments of the present disclosure, a bottom surface of each lug facing the coil block may be formed with a coil block supporter supporting the coil block.

In some exemplary embodiments of the present disclosure, each magnet may take a shape of a triangular prism.

In some exemplary embodiments of the present disclosure, one lateral surface of the magnet facing the external lateral surface of the bobbin may be formed with a curved surface having a same gap as that of the external lateral surface of the bobbin, and remaining other lateral surfaces meeting the curved surface may be formed with vertical surfaces.

In some exemplary embodiments of the present disclosure, each magnet may take a shape of a plate.

In some exemplary embodiments of the present disclosure, the lens and the bobbin may be integrally formed.

In some exemplary embodiments of the present disclosure, each magnet may be formed with a first height, and the coil block may be formed with a second height lower than the first height for obtaining a stroke length of the bobbin.

In some exemplary embodiments of the present disclosure, a coil block center bisecting the height of the coil block may be aligned with a magnet center bisecting the height of the magnet.

In some exemplary embodiments of the present disclosure, the VCM may further include an elastic member elastically supporting a bottom surface of bobbin.

In some exemplary embodiments of the present disclosure, the elastic member may be secured between the base and the magnet.

In some exemplary embodiments of the present disclosure, the elastic member may include first and second elastic members respectively arranged at the bottom surface of the bobbin, and one distal end of the coil block and the other distal end facing the one distal end of the coil block may be electrically connected to the first and second elastic members.

In some exemplary embodiments of the present disclosure, the elastic member may include an external elastic unit secured by the magnet, an inner elastic unit secured to the bobbin and arranged at an inner side of the external elastic unit, and a connection elastic unit connecting the external elastic unit and the inner elastic unit.

In some exemplary embodiments of the present disclosure, an insulation member insulating the cover can and the coil block may be formed either on an inner lateral surface of the cover can facing the coil block or on an external lateral surface of the coil block.

Technical problems to be solved by the present disclosure are not restricted to the above-mentioned description, and any other technical problems not mentioned so far will be clearly appreciated from the following description by the skilled in the art.

There is an advantageous effect in the voice coil motor according to the present disclosure in that a driving force of bobbin is improved and size of bobbin is increased to have a proper structure for increasing size of lens mounted on the bobbin.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
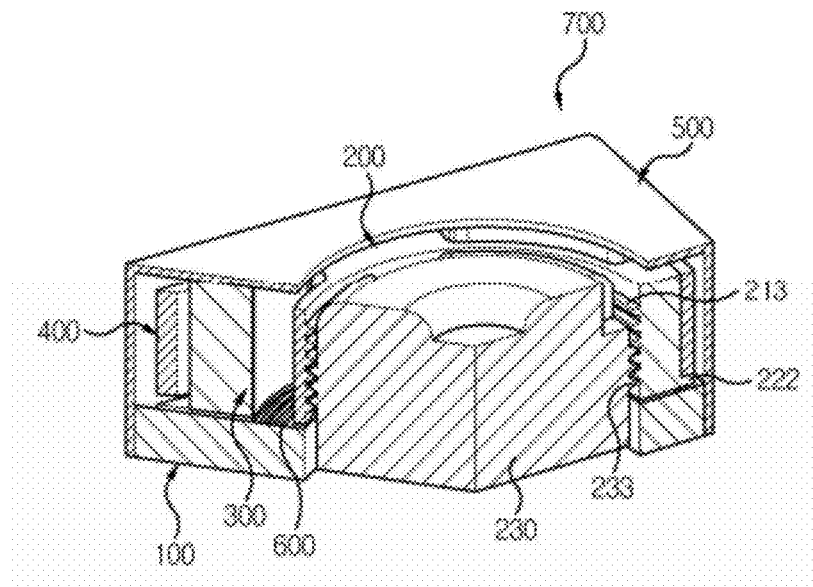
FIG. 1 is a partially cut-out perspective view of a voice coil motor according to an exemplary embodiment of the present disclosure.

Advantages and features of the present invention may be understood more readily by reference to the following detailed description of exemplary embodiments and the accompanying drawings.

Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms.

In the drawings, the width, length, thickness, etc. of components may be exaggerated or reduced for the sake of convenience. Furthermore, throughout the descriptions, the same reference numerals will be assigned to the same elements in the explanations of the figures, and explanations that duplicate one another will be omitted. Now, a voice coil motor according to the present disclosure will be described in detail with reference to the accompanying drawings.

Figure 2:
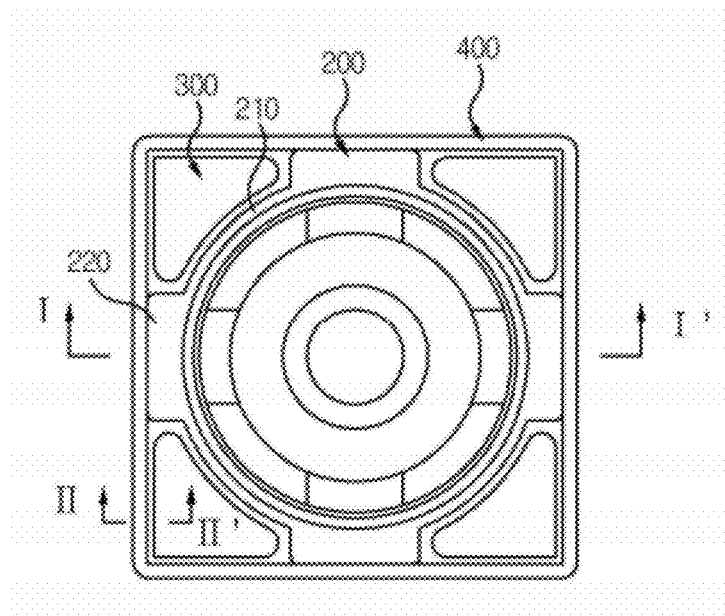
FIG. 2 is a perspective view in which a bobbin, a coil block and a magnet of FIG. 1 are extracted.
Figure 3:
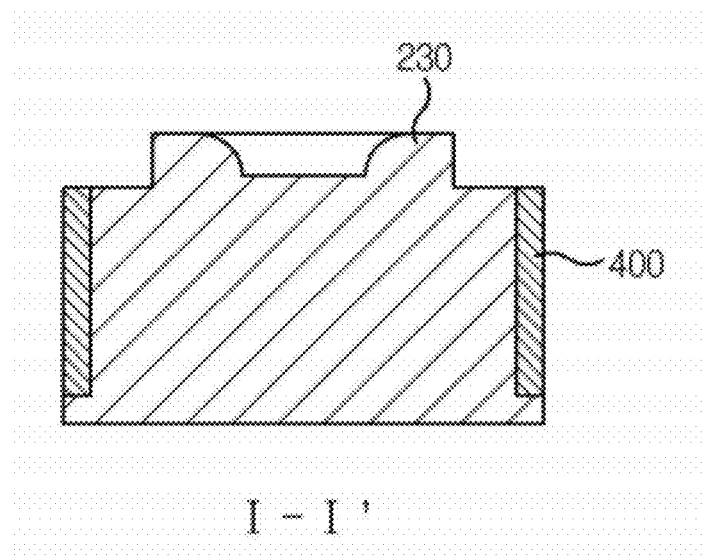
FIG. 3 is a cross-sectional view taken along line I-I' of FIG. 2.
Figure 4:
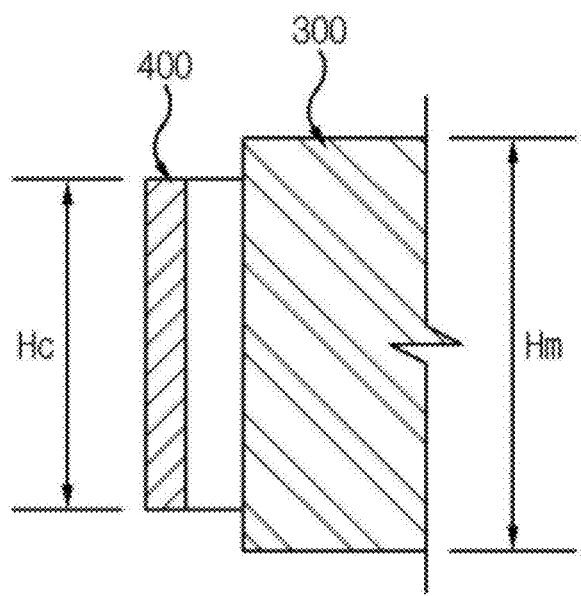
FIG. 4 is a cross-sectional view taken along line II-II' of FIG. 2

FIG. 1 is a partially cut-out perspective view of a voice coil motor according to an exemplary embodiment of the present disclosure, FIG. 2 is a perspective view in which a bobbin, a coil block and a magnet of FIG. 1 are extracted, FIG. 3 is a cross-sectional view taken along line I-I' of FIG. 2, and FIG. 4 is a cross-sectional view taken along line II-II' of FIG. 2

Referring to FIGS. 1 to 4, a voice coil motor (VCM, 700) may include a base (100), a bobbin (200), a plurality of magnets (300), a coil block (400) and a cover can (500). In addition, the VCM (700) may further include an elastic member (600).

The base (100) may take a shape of a plate, for example and may be centrally formed with an opening passing through an upper surface of the base (100) and a bottom surface opposite to the upper surface of the base (100).

The bobbin (200) may include a bobbin body (210) and a lug (220). The bobbin body (210) may take a shape of a cylinder with a hollow hole formed therein, and be formed at an inner surface thereof with a female thread unit (213), for example.

An interior of the bobbin body (210) may be arranged with an interior-filled cylindrical lens (230) and a periphery of the lens (230) may be formed with a male thread unit (233), where the male thread unit (233) of the lens (230) and the female thread unit (213) of the bobbin body (210) are respectively coupled in a screw combination style.

Although the exemplary embodiment of the present disclosure has explained and illustrated the bobbin body (210) and the lens (230) respectively coupled in a screw combination style, it should be apparent that the bobbin body (210) and the lens (230) may be integrally formed.

The lug (220) may protrude in the shape of a pillar from a periphery of the bobbin body (210), and may include a plurality of lugs that are protruded from the periphery of the bobbin body (210). For example, four lugs (220) may be protruded from the periphery of the bobbin body (210), and each of the lugs (220) is formed from the periphery of the bobbin body (210) at an equal distance.

Each of the four lugs (220) protruded from the periphery of the bobbin body (210) is of the same size, and each lateral surface of the lug (220) opposite to the coil block (described later) is flatly formed.

Meantime, the lateral surface of each of the four lugs (220) protruded from the periphery of the bobbin body (210) and the coil block (described later) are formed in parallel, and each lateral surface of the lugs (220) adjacently arranged at right angle is vertically arranged.

The magnet (300) is interposed between a pair of lugs (220) adjacently formed at the bobbin body (210) of the bobbin (200). In a case four lugs (220) are formed in the exemplary embodiment of the present disclosure, the number of magnets is also four. Each magnet (300) in the exemplary embodiment of the present disclosure is arranged on an upper surface of the base (100).

In the exemplary embodiment of the present disclosure, in a case four lugs (220) are formed at the periphery of the bobbin body (210), for example, four magnets (300) are arranged among the lugs (220) of the bobbin body (210). In the exemplary embodiment of the present disclosure, each magnet (300) may substantially take a shape of a triangular prism, for example. Any one distal end of both distal ends opposite to each magnet (300) having the substantially triangular prism shape is arranged on an upper surface of the base (100), and one lateral surface opposite to the periphery of the bobbin body (210) among three lateral surfaces having the substantially triangular prism shape is formed with a curved surface having a similar curvature as that of the periphery of the bobbin body (210).

Meantime, remaining two lateral surfaces not facing the periphery of the bobbin body (210) are vertically arranged. In the exemplary embodiment of the present disclosure, the lateral surface of each lug (220) is further forwardly protruded than the two lateral surfaces of the magnet (300) not meeting the periphery of the bobbin body (210), whereby interference by contact between the coil block (400, described later) and the magnet (300) can be prevented.

Although the exemplary embodiment of the present disclosure has explained and illustrated the magnet (300) having a pillar shape of a substantially triangular prism, it should be apparent that the magnet (300) may take a plate shape.

The coil block (400) may wrap the magnet (300) and the bobbin (200). The coil block (400) is formed by a long electric wire insulated by insulated resin to wrap the bobbin (200) and the magnet (300). Alternatively, a coil block (400) wound in an adequate shape to wrap the bobbin (200) and the magnet (300) may be coupled to the bobbin (200). It should be apparent that the coil block (400) takes a shape of a square frame and secured to the lateral surface of the lug (220) of the bobbin body (210). In the exemplary embodiment of the present disclosure, the coil block (400) and the lug (220) may be mutually coupled using an adhesive, for example.

In order to secure the coil block (400) to the lateral surface of the lug (220), a bottom surface of the lug (220) may be formed with a coil block supporter (222), where the coil block supporter (222) may take a shape of a bar or a lug from a bottom side of the lateral surface of the lug (220). The square frame-shaped coil block (400) is arranged with the lateral surface of the lug (222) in parallel, and is also arranged with two vertical lateral surfaces on the magnet (300) in parallel.

Because the lateral surface of the lug (220) of the bobbin (200) is protruded from the magnet (300), a gap is formed between the coil block (400) and the magnet (300), such that the coil block (400) and the magnet (300) are not mutually interfered by the gap.

In the exemplary embodiment of the present disclosure, because the magnet (300) is arranged inside the coil block (400) and the coil block (400) is formed at outside of the magnet (300), the coil block (400) faces a pair of mutually vertical lateral surfaces in each magnet (300). Thus, an electromagnetic force can be increased to drive the bobbin (200), and because the bobbin (200) is not restricted by the number of windings and/or length of the winding of the coil block (400), up-down capacity of the bobbin (200) can be enhanced to freely adjust a size of the lens mounted at the bobbin (200).

Meanwhile, a height (hc) of the coil block (400) is smaller than that (hm) of the magnet (300) to obtain a stroke height of the bobbin (200) when the coil block (400) is upped and downed along with the bobbin (200).

In a case the height of the coil block (400) is smaller than that of the magnet (300), a coil block center bisecting the height of the coil block (400) may be aligned with a magnet center bisecting the height of the magnet (300). Alternatively, it should be apparent that the coil block center of the coil block (400) is higher or lower than the magnet center according to driving characteristic of the bobbin (200).

The elastic member (600) is arranged at a bottom surface of the bobbin body (210) and elastically supports the bobbin (200).

The elastic member (600) may include an external elastic unit secured between the base (100) and the magnet (300), an inner elastic unit secured to a bottom surface of the bobbin body (210), and a connection elastic unit connecting the external elastic unit and the inner elastic unit. In the exemplary embodiment of the present disclosure, the elastic member (600) may include mutually electrically insulated first and second elastic members, and one distal end of the coil block (400) coupled to the bobbin (200) is electrically connected to the first elastic member, and the other distal end facing the one distal end of the coil block (400) may be electrically connected to the second elastic member.

The elastic member (600) may be arranged at an upper surface of the base (100) and secured by the magnet (300) arranged at the upper surface of the base (100). Meanwhile, an insulation member for preventing a driving signal applied to the elastic member (600) from being applied to the magnet (300) may be arranged between the elastic member (600) and the magnet (300).

The cover can (500) includes an upper plate (510) and a lateral surface plate (520). The upper plate (510) takes a shape of plate and is formed with an opening exposing the lens (230), and an external light is incident on the lens (230) through the opening of the upper plate (510). The upper plate (510) may be a square plate, for example, in the exemplary embodiment of the present disclosure.

The lateral surface plate (520) is bent or extended to a direction wrapping the magnet (300) and the coil block (400) from each edge of the upper plate (510), where the lateral surface plate (520) is coupled to the base (100).

In the exemplary embodiment of the present disclosure, the cover can (500) including the upper plate (510) and the lateral surface plate (520) functions as a yoke that prevents magnetic field from being leaked. The cover can (500) enhances a driving force generated from the coil block (400) and the magnet (300) by preventing magnetic field generated by the magnet (300) and/or coil block (400) from being leaked.

Meanwhile, in a case the coil block (400) upped and downed at an inner lateral surface of the lateral surface plate (520) of the cover can (500) is frequently brought into contact with the lateral surface plate (520), there may be generated a short-circuit on the lateral surface plate (520) and the coil block (400) by damages on the insulation resin insulating the coil block (400).

In the exemplary embodiment of the present disclosure, in order to prevent the short-circuit on the lateral surface plate (520) of the cover can (500) and the coil block (400) from happening, an insulation membrane, an insulation member such as an insulation plate, an insulation plate or an insulation resin that insulates the lateral surface plate (520) and/or the coil block (400) may be arranged on at least any one of the lateral surface plate (520) of the cover can (500) and the coil block (400)

As apparent from the foregoing, the VCM according to the present disclosure has an industrial applicability in that a magnet is arranged at a place adjacent to a bobbin mounted with a lens, a coil block generating a magnetic field is arranged at an outside of the magnet to prevent a driving force from being decreased by a length restriction of the coil block, whereby an aperture of the lens mounted at the bobbin can be adequately increased, and the driving force can be further enhanced by preventing the magnetic field generated by the magnet and the coil block from being leaked.

Although the present disclosure has been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A voice coil motor (VCM), the motor comprising:
    a base formed with an opening;
    a bobbin disposed on the base and including a bobbin body and a plurality of protrusions protruded from the bobbin body;
    a plurality of magnets secured on the base and spaced apart from the bobbin;
    a coil block encompassing each magnet and the bobbin, and secured to the protrusions of the bobbin; and
    a cover can encompassing the magnets and the coil block; wherein the bobbin and the coil block secured to the bobbin move along or parallel to an optical axis of a lens.

2. The VCM of claim 1, wherein the protrusions are protruded toward the cover can farther than are the plurality of magnets.

3. The VCM of claim 1, wherein the bobbin takes a shape of a cylinder, and each of the protrusions is protruded at an equi-distance from the bobbin body.

4. The VCM claim 1, wherein each of the magnets is arranged at both sides of each protrusion, and distanced from the coil block.

5. The VCM of claim 1, wherein the plurality of protrusions includes four protrusions formed at the bobbin body.

6. The VCM claim 1, wherein each lateral surface of each protrusion facing the coil block is arranged in parallel with the coil block, and each lateral surface of a pair of adjacently arranged protrusions is arranged at a right angle.

7. The VCM of claim 1, wherein each protrusion and the coil block are mutually attached by an adhesive.

8. The VCM of claim 1, wherein the coil block takes a shape of a square strip when viewed from a top view.

9. The VCM of claim 1, wherein a coil block supporter supporting the coil block is formed at a lower portion of each protrusion facing the coil block.

10. The VCM of claim 1, wherein each magnet takes a shape of a triangular prism.

11. The VCM of claim 10, wherein one lateral surface of each magnet facing the bobbin body is formed with a curvature having a same gap apart from the bobbin body.

12. The VCM of claim 1, wherein each magnet takes a shape of a plate.

13. The VCM of claim 1, wherein the lens and the bobbin are integrally formed.

14. The VCM of claim 1, wherein each magnet is formed with a first height, and the coil block is formed with a second height lower than the first height.

15. The VCM of claim 14, wherein a coil block center bisecting the height of the coil block is aligned with a magnet center bisecting the height of the magnets.

16. The VCM of claim 1, further comprising an elastic member elastically supporting a bottom surface of the bobbin.

17. The VCM of claim 16, wherein the elastic member is disposed between the base and the magnets.

18. The VCM of claim 16, wherein the elastic member includes first and second elastic parts respectively arranged at the bottom surface of the bobbin, and one distal end of the coil block and the other distal end are electrically connected to the first and second elastic parts, respectively.

19. The VGM of claim 16, wherein the elastic member includes an outer portion, an inner portion secured to the bobbin, and a connection portion connecting the outer portion and the inner portion.

20. The VCM of claim 1, wherein an insulation member insulating the cover can and the coil block is formed either on an inner lateral surface of the cover can facing the coil block or on an external lateral surface of the coil block.

\* \* \* \* \*